United States Patent
Yu et al.

(10) Patent No.: US 6,970,840 B1
(45) Date of Patent: Nov. 29, 2005

(54) METHOD AND SYSTEM FOR PROVIDING VIRTUAL ACCESS TO INFORMATION DISTRIBUTED ACROSS HETEROGENEOUS CATALOG SERVERS

(75) Inventors: Jin Yu, Mountain View, CA (US); Jun Chen, Sunnyvale, CA (US); Hseuping Chen, Milpitas, CA (US)

(73) Assignee: Martsoft Corporation, Santa Clara, CA (US)

( * ) Notice: Subject to any disclaimer, the term of this patent is extended or adjusted under 35 U.S.C. 154(b) by 464 days.

(21) Appl. No.: 09/680,676

(22) Filed: Oct. 6, 2000

(51) Int. Cl.[7] ............................................. G06F 17/60
(52) U.S. Cl. ............................................................ 705/27
(58) Field of Search .................... 705/26, 27; 707/100, 707/101

(56) References Cited

U.S. PATENT DOCUMENTS

| | | | | |
|---|---|---|---|---|
| 5,560,005 | A  * | 9/1996 | Hoover et al. ................. | 707/10 |
| 5,596,744 | A  * | 1/1997 | Dao et al. ...................... | 707/10 |
| 5,806,066 | A  * | 9/1998 | Golshani et al. ............. | 707/100 |
| 6,381,605 | B1 * | 4/2002 | Kothuri ....................... | 707/100 |
| 6,389,409 | B1 * | 5/2002 | Horovitz et al. ............... | 707/2 |
| 6,397,125 | B1 * | 5/2002 | Goldring et al. ............. | 700/200 |
| 6,457,011 | B1 * | 9/2002 | Brace et al. ................... | 707/10 |
| 6,484,161 | B1 * | 11/2002 | Chipalkatti et al. ............ | 707/3 |
| 6,523,032 | B1 * | 2/2003 | Sunkara et al. ................ | 707/8 |
| 6,564,218 | B1 * | 5/2003 | Roth ............................ | 707/10 |
| 6,578,030 | B1 * | 6/2003 | Wilmsen et al. ............... | 707/3 |

FOREIGN PATENT DOCUMENTS

JP            08272870 A  * 10/1996   ........... G06F 17/60

OTHER PUBLICATIONS

"Microsoft Computer Dictionary, Fourth Edition;" Microsoft Press, 1999.*

* cited by examiner

Primary Examiner—Jeffrey A. Smith
(74) Attorney, Agent, or Firm—Sawyer Law Group LLP

(57) ABSTRACT

A method and system for providing virtual access to product/service information distributed across heterogeneous catalog systems is disclosed. The method and system include subscribing a first catalog server to at least a portion of the information stored on one or more remote catalog systems, thereby creating a subscribing catalog server. Thereafter, a replication process is performed to synchronize information on the subscribing catalog server with the subscribed information on the remote catalog systems. A user may then use the subscribing catalog server to search and browse the synchronized information, thereby providing one site for viewing information from multiple catalog servers.

11 Claims, 4 Drawing Sheets

METHOD AND SYSTEM FOR PROVIDING VIRTUAL ACCESS TO INFORMATION DISTRIBUTED ACROSS HETEROGENEOUS CATALOG SERVERS

FIELD OF THE INVENTION

The present invention relates to online catalog databases, and more particularly, to a method and system for providing virtual access to information distributed across heterogeneous catalog systems.

BACKGROUND OF THE INVENTION

Business-to-business (B2B) electronic commerce (e-commerce) refers to one business selling to another business via the Internet. According to the GarnetGroup, B2B e-commerce is expected to grow from $145 billion in 1999 to more than $7 trillion by 2004, which will represent more than 7% of all sales transactions worldwide.

B2B e-commerce is carried out between companies having products/services to sell and companies desiring to purchase such products/services. The selling companies have sites on the Internet where buyers may come to shop for the seller's products/services. Typically, the seller's products/services are stored in on-line catalog databases that are made available over the Internet by catalog servers. The buyers also store desired product information in local procurement systems, which also include a catalog database that is accessed by the buyer's catalog server.

The on-line catalogs from the various seller's store different types of data in different formats, and are therefore heterogeneous systems that are incompatible with each other and with the buyer's catalog database. Therefore, buyer's must browse the product catalogs of each seller, and any desired product information from the seller's catalog is either manually typed into the buyer's catalog database or paper copies are scanned-in electronically. If the buyer fails to make a purchasing decision quickly, then the product data integrated into the buyer's catalog database may become stale and out of date due to updates that have occurred in the seller's catalogs.

Accordingly, what is needed is an improved system for accessing catalog data from heterogeneous catalog databases. The present invention addresses such a need.

SUMMARY OF THE INVENTION

The present invention provides a method and system for providing virtual access to information distributed across heterogeneous catalog systems. The method and system include subscribing a first catalog server to at least a portion of the information stored on one or more remote catalog systems, thereby creating a subscribing catalog server. Thereafter, a replication process is performed to synchronize information on the subscribing catalog server with the subscribed information on the remote catalog system. A user may then use the subscribing catalog server to search and browse the synchronized information, thereby providing one site for viewing information from multiple catalog servers.

According to the method and system disclosed herein, the e-commerce catalog system enables catalog data interoperability and the sharing of on-line catalogs through the establishment of linking relationships and resulting content aggregation. In addition, supply chains are streamlined because any changes in price, promotions, or other product features are reflected in a timely and convenient manner to buyers.

DETAILED DESCRIPTION OF THE INVENTION

The present invention relates to providing access to information stored on heterogeneous catalog databases over a network. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

Figure 1:
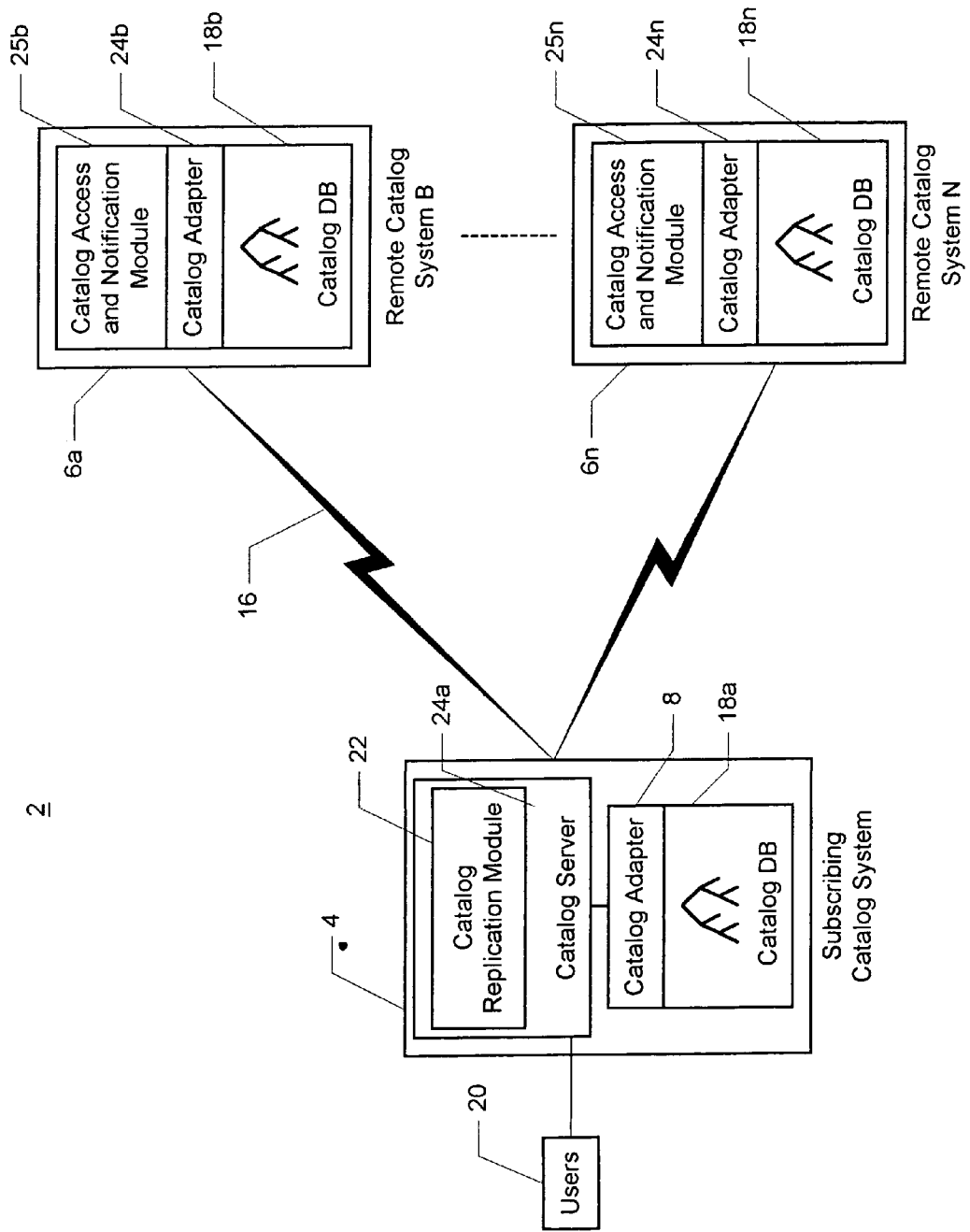
FIG. 1 is a block diagram illustrating an electronic catalog system in accordance with the present invention.

FIG. 1 is a block diagram illustrating an on-line catalog system in accordance 1 $\mu$g with the present invention. The catalog system 2 includes a subscribing catalog system 4 and multiple remote catalog systems 6a through 6n (collectively referred to as catalog systems 6) that are sites on a network 16, such as the Internet. Each of the catalog systems 4 and 6 include respective catalog databases 18, where the catalog databases 18a and 18n of the remote catalog systems 6 contain heterogeneous product/service data. The subscribing catalog system 4 includes a subscribing catalog server 8 representing the server side of client/server software that allows a user 20 to access the category database 18a through a web browser.

Typically, a catalog is a collection of product/service information represented as a hierarchy of product categories, and each product category contains a list of products. Each product is described by a set of attributes which are defined by the product's category. This type of catalog data is stored as a tree structure that has multiple nodes. Each node may represent one product category and/or one product, and each node may have multiple children nodes.

According to the present invention, during a subscription process, catalog server 8 subscribes to the remote catalog systems 6, and during a replication process, catalog server 8 gains access to some or all of the catalog data stored in the remote catalog systems 6 to which it has subscribed. Catalog server 8 may therefore be referred to as a subscribing catalog server. Users 20 may then search and browse the catalog data of the remote catalog systems 6 using only the subscribing catalog server 8. When changes are made to the catalog data on the remote catalog systems 6, the changes are automatically propagated to the subscribing catalog server 8, so users 20 will have the most current information to make purchasing decisions.

In one preferred embodiment of the present invention, the subscribing system 4 represents a buying entity that needs to gain access to the catalog data stored on the catalog servers of its suppliers. In another preferred embodiment, the subscribing system 4 represents a retail portal on the Internet, where a retailer aggregates the catalog data from various supplier catalog servers to create a centralized catalog database that is made available to the users of the retail portal.

In a preferred embodiment of the present invention, the subscription and replication process are implemented using a catalog replication module 22 on the catalog server 8, and a catalog access and notification module 25 on the remote catalog systems 6. The catalog replication module 22 in conjunction with the catalog access and notification module 25 provides the subscribing catalog server 8 with virtual and unified access to the product information distributed across the multiple remote catalog systems 6.

Catalog adapter software 24 is used by both the subscribing catalog system 4 and the remote catalog systems 6. The catalog adapter software 24 is a standard for representing product catalog data and for enabling the exchange of product catalogs between systems, as explained further below.

Figure 2:
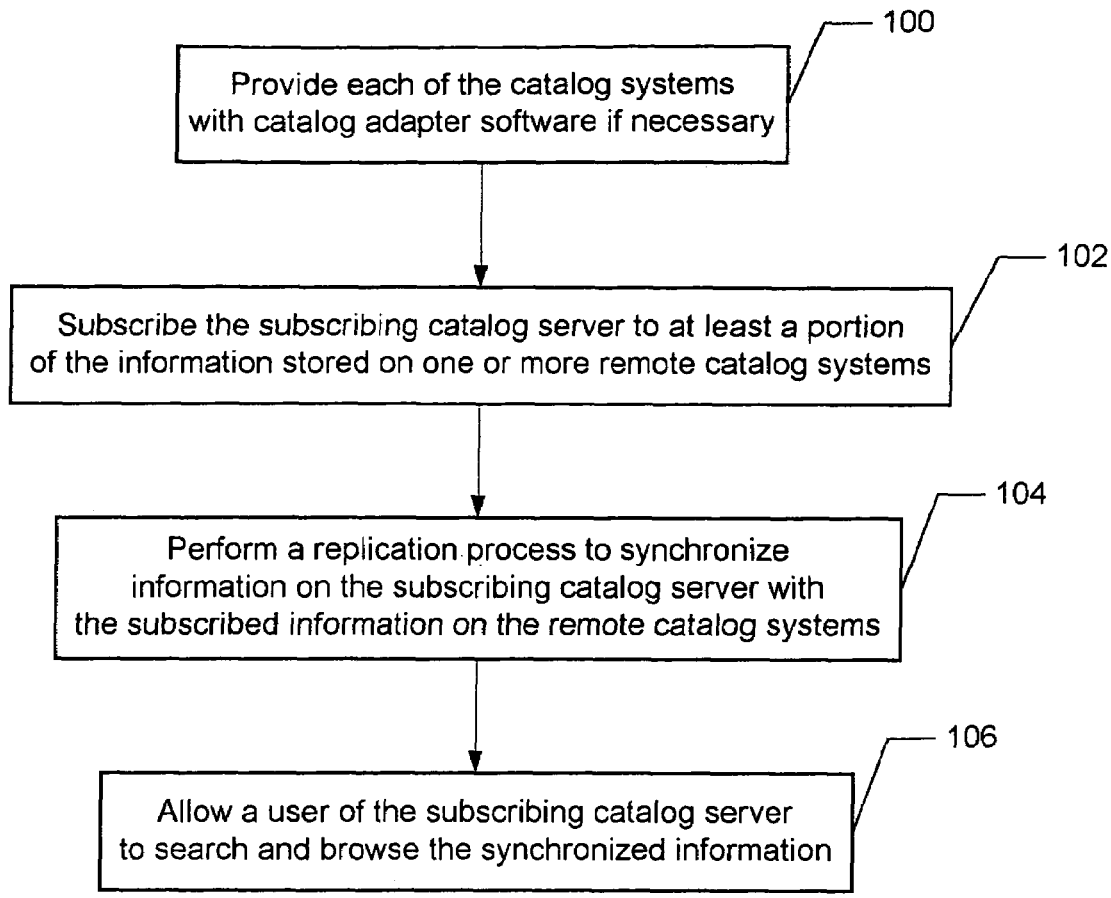
FIG. 2 is a flow chart illustrating a process for providing virtual access to information distributed across heterogeneous catalog systems in accordance with the present invention.

FIG. 2 is a flow chart illustrating a process for providing virtual access to information distributed across heterogeneous catalog systems in accordance with the present invention. The process begins by providing the subscribing catalog system 4 and the remote catalog systems 6 with catalog adapter software 24 if necessary in step 100. The catalog adapter software 24 may only be necessary where the catalog database 18 of a particular catalog system is incompatible with the other catalog systems.

In a preferred embodiment, the catalog adapter software 24 comprises a public standard referred to as open catalog format (OCF) and open catalog protocol (OCP) developed by the assignee of the present application. The OCF and OCP specify desired catalog functions and formats and the catalog replication module 22 fulfills the functionality. The OCF describes how to represent and store single products, single product categories (and subsets thereof), and entire product catalogs. The OCP defines a protocol that the catalog systems 4 and 6 use to communicate OCF-formatted catalog information. In addition to specifying the interaction between catalog systems, OCP also specifies the interactions between users and the catalog server 8. In a preferred embodiment, OCP is implemented using XML. Those with ordinary skill in the art will appreciate that other types of adapter software may be used with the present invention.

After the catalog systems 4 and 6 have been provided with the category adapter software 24, the subscribing catalog server 8 subscribes to some or all of the information stored on one or more remote catalog systems 6 in step 102. After the subscription process, a replication process is performed in step 104 to synchronize the information on the subscribing catalog server 8 with the information on the remote catalog systems 6 subscribed to by the subscribing catalog server 8, creating a virtual unified catalog database 18a. After the information has been replicated, users 20 of the subscribing catalog server 8 can browse and perform parametric queries and searches on the catalog database 18a in step 106. Thus, the subscribing catalog server 8 of the present invention provides one site on the network 16 for users 20 to view information from multiple remote catalog systems 6 and access the most up-to-date catalog content.

Figure 3:
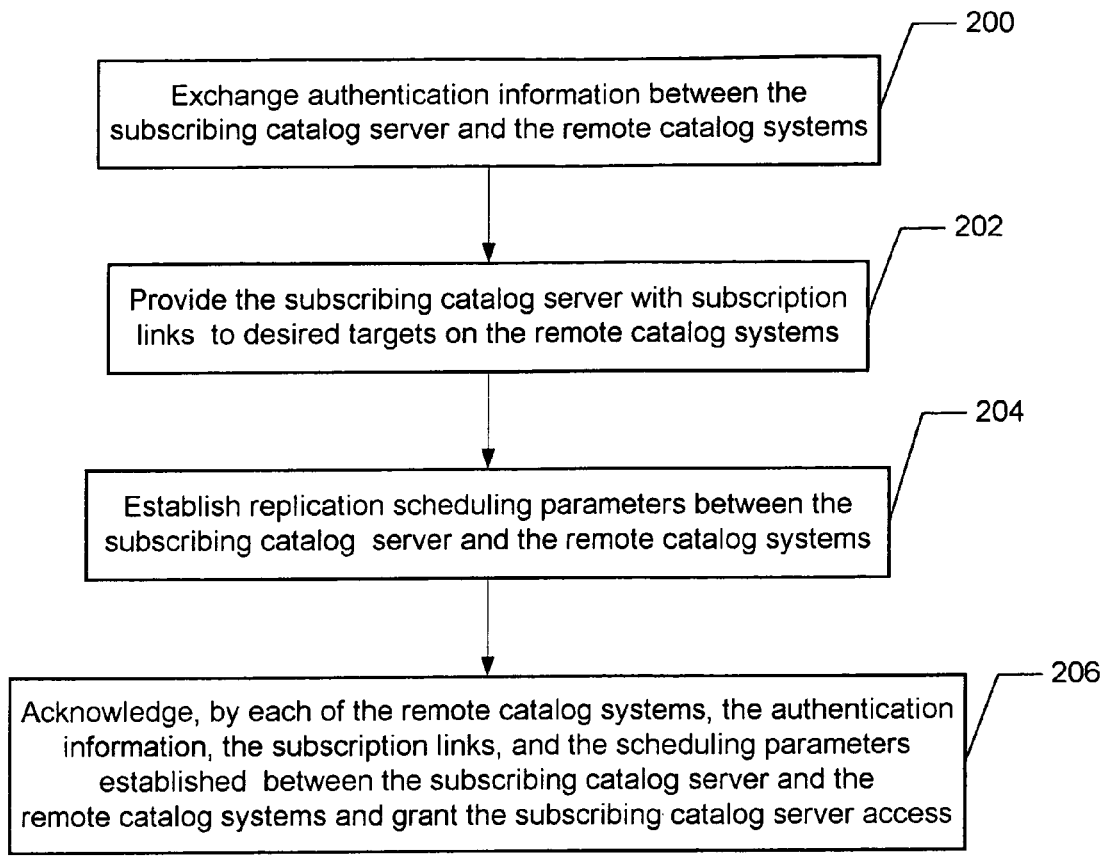
FIG. 3 is a block diagram illustrating the subscription process.

Referring now to FIG. 3, a flow chart illustrating the subscription process is shown in one preferred embodiment of the present invention. The subscription process is a one-to-many process where the subscribing catalog server 8 is configured to access multiple remote catalog systems 6. The process begins by exchanging authentication information between the subscribing catalog server 8 and the remote catalog systems 6 in step 200. Next, the subscribing catalog server 8 is provided with links to desired targets on the remote catalog system in step 202, where targets represent nodes in the catalog trees stored in the catalog databases 18b and 18n of the remote catalog systems 6.

In a preferred embodiment, a systems administrator adds the links to the subscribing catalog server 8 by visiting the web site of each of the remote catalog systems 6 using a web browser, browsing the catalog data displayed from the corresponding catalog database, and copying Universal Resource Locators (URLs) for the desired products and/or categories into the catalog database 18a.

In a preferred embodiment, two types of the subscription linking may be used to facilitate remote catalog access; subscription index, and subscription product. In subscription index, only indexes to the catalog data on the remote catalog systems 6 are established and the actual data is retrieved on demand to provide the most current product information. In subscription product, remote catalog data is replicated locally on the subscribing catalog server 8 for fastest access.

Referring still to FIG. 3, after establishing the links, replication scheduling parameters between the subscribing catalog server 8 and the remote catalog systems 6 are established in step 204. The scheduling parameters indicate the times and/or events that trigger the replication of catalog data from the remote catalog systems 6 to the subscribing catalog server 8. The time parameters specify the times or time intervals at which the data should be replicated. The event parameters specify that replication should occur once some number of changes/updates to the data on the remote server 14 has been detected.

After step 200, 202, and 204 has been performed for the subscribing catalog server 8, the remote catalog systems 6 acknowledge the authentication information, the subscription links and the scheduling parameters, in step 206 and grant access to the subscribing catalog server 8 (which typically requires human intervention).

Figure 4:
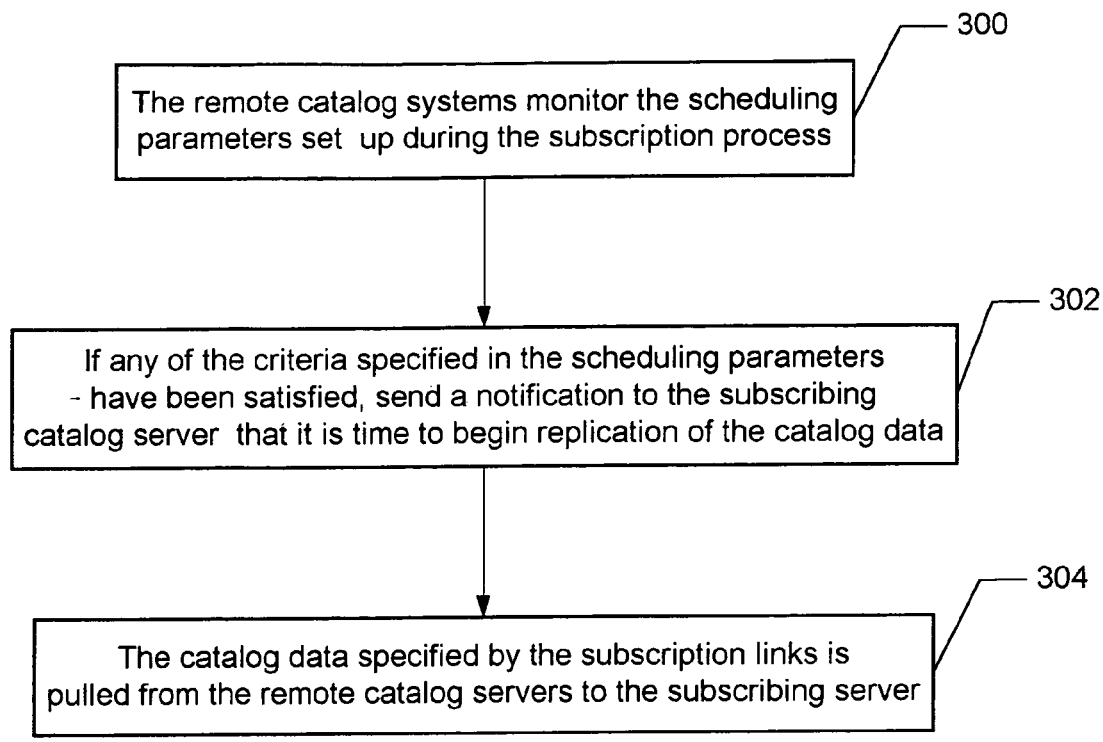
FIG. 4 is a flow chart illustrating the replication process in accordance with a preferred embodiment of the present invention.

FIG. 4 is a flow chart illustrating the replication process in accordance with a preferred embodiment of the present invention. The replication process is a many-to-1 process whereby each of the remote catalog systems 6 synchronizes their data with the data on the subscribing catalog server 8 using the catalog access and notification module 25. Each remote catalog system 6 begins the replication process by monitoring the scheduling parameters set up during subscription the process in step 300. If the scheduling parameters are time based, then the remote catalog systems 6 monitors the times or time intervals specified. If the scheduling parameters are event based, then the remote catalog systems 6 monitors the amount of changes that have been made to its respective catalog database 18.

If any of the criteria specified in the scheduling parameters have been satisfied in step 302, then the remote catalog system 6 sends a notification to the subscribing catalog server 8 that it is time to begin replication of the catalog data. Any time thereafter, the catalog data specified by the links may be pulled from the remote catalog systems 6 to the subscribing catalog server 8 in step 304.

If subscription index links were specified, then only indexes to the catalog data on the remote catalog systems 6 are created on the subscribing catalog server 8. If subscription product links were specified, then the catalog access and notification module 25 serves the catalog data being pulled by the subscribing catalog system 4 from the remote catalog systems 6.

After the replication process, a user 20 of the subscribing catalog server 8 may browse the newly created catalog database on the subscribing catalog server 8 and perform parametric queries on information contained therein. If the user 20 attempts to access data that is indexed according to subscription index links, then when the user 20 attempts to access data that is listed in the index, the corresponding data is pulled from the remote catalog systems 6 in real-time, thereby retrieving and displaying the most current data. If the user 20 attempts to access data that was provided by subscription product links, then the data is retrieved locally from the subscribing catalog server's database 18*a*, providing faster access.

In a preferred embodiment of the present invention, the links established during the subscription process to establish relationships between two products or two categories are provided by the OCF. The links are unidirectional, and are specified in the subscribing catalog server product/category. The OCF/OCP catalog specification may be found at XML.org (www.xml.org/xmlorg_registry/index.html), and is hereby incorporated by reference. Portions of the specification are reproduced here in below for convenience.

Before building the subscription relationship, the owner of link source (the subscribing catalog server) sends a request to the owner of the link destination (the remote catalog system), perhaps by email with link description as an attachment. If the owner of the destination grants the request, it adds an entry for the source into the parameter "s-remote-notify," which is an enumeration of strings. Each string of the enumeration represents the URL of a source category. After the owner of the source receives the confirmation, it adds the subscription link to the source category.

When changes in link destination reach a certain threshold (the unit of threshold is the number of accumulated changes, for example, 2 new items are added, updated 1, removed 1, the accumulated changes are 4. If the threshold is set as 4 or less, the notification will be triggered) and/or reaches the schedule (a certain amount of time has expired since last notification, schedule could be set as immediately, nightly, weekly . . . ), a notification request is sent to the source of the link. An example request is shown below:

```
<ocp-request>
<part>
<opcode name="NOTIFY"/>
<path url="ocp://catalog.killerwhale.com/Computers/"/><!-- link src -->
<data>
<catalog>
<category name="ocp://catalog.bluewhale.com/Computers/"/><!-- link dst -->
</catalog>
</data>
</part>
</ocp-request>
```

The response to this opcode is empty.

When the link source has decided to pull data after receiving notification from link destination, it issues a replication request to the link destination. An example request is shown below:

```
<ocp-request>
<part>
<opcode name="REPLICATE"/>
<path url="ocp://catalog.bluewhale.com/Computers/"/><!-- link dst -->
<data>
<catalog>
<category name="ocp://catalog.killerwhale.com/Computers/"/><!-- link src -->
</catalog>
</data>
</part>
</ocp-request>
```

The link destination replies with newly added, modified, and removed product details. The "n-replication" parameter indicates whether the product is to be added, modified, or removed from the link source. The link source must have read access to the link destination (for example, having a member account in the destination catalog server). An example response is shown below:

```
<ocp-response>
<part>
<data>
<catalog>
   <product name="/Computers/987654321">
      <param name="n-replication" value="ADD"/>
      <attr . . . />
   </product>
   <product name="/Computers/987654322">
      <param name="n-replication" value="MODIFY"/>
      <attr . . . />
   </product>
   <Product name="/Computers/987654323">
      <param name="n-replication" value="REMOVE"/>
      </No content necessary—>
   </product>
</catalog>
</data>
</part>
</ocp-response>
```

With subscription-index links, the source of the link indexes children products in the destination category. During search operation, only product paths are returned to the subscribing catalog server and the subscribing catalog server is responsible for retrieving the product details from the link destination catalog server. During browse operation, the links are returned to the subscribing catalog server and then the subscribing catalog server will follow the links to retrieve the products.

An example of subscription-index link is shown below:

source:
```
<category name="Computers">
   <link name="" type="subscription-index"
value="ocp://catalog bluewhale.com/Computers/"/>
</category>
```
destination:
```
<category name="Computers">
   <param name="s-remote-notify" type="strings">
   <value>
      <val>ocp://catalog.killerwhale.com/Computers/</val>
      <val> . . . </val>
   </value>
   </param>
</category>
```

A subscription-product link performs every function of the subscription-index link. In addition, it also replicates products of the destination category in the source category.

For instance, source:
```
<category name="Computers">
   <link name=" " type="subscription-product"
value="ocp://catalog.bluewhale.com/Computers"/>
```

</category>
destination: same as in replicate-index link example.

OCP

As described above, OCP is an XML-based application level protocol that enables the searching, retrieval, and updating of product information and the exchange of complex data between product catalogs. OCP comprises a language-independent representation of catalog data based on XML 1.0, and a set of protocol opcodes for specifying a wide variety of operations on a catalog. OCP itself does not include any transport mechanisms. It relies on lower level transport protocols such as HTTP or STP (Simple Transport Protocol). This document explains the semantics of each OCP protocol opcode.

Relationship with OCF (Open Catalog Format)

OCF is the syntax for describing products and catalog information. OCP uses OCF to carry and exchange catalog data. It also uses OCF to implement part of its protocol semantics.

OCP URL

An OCP URL is similar to an HTTP URL. It has three forms:
1. Absolute: starting with "ocp:"-Eg. ocp://www.martsoft-.com/Accessory/Modem/referring to a category path in the remote catalog
2. Locally absolute: starting with "/"-Eg./x/y/z/0074 referring to a local product path
3. Relative: relative references such as "y/z/"

Note: relative references such as "../z/" are currently not allowed. URLs end with "/" denote categories, otherwise products.

Description of OCP Opcodes

In OCF, "path" is a Locally Absolute OCP URL. Path info usually identifies the target entity on which the operation will be performed.

OCF parameters that influence OCP
n-cat-size
n-result-range/n-result-size

The "n-result-range" parameter is used by OCP clients to request for a subset of browse/query results. The first request should supply a result range of "[1,w]"; e.g. [1,10]. The client may then issue additional requests with different result ranges, such as [11,20]. The reply to a request with "n-result-range" should contain a parameter "n-result-size", specifying the size of entire result, e.g. 1200. For browse requests, result ranges with different range sizes can be specified in additional requests. However, for query requests, result ranges must have the same range size, and ranges must be properly aligned. The range size is determined by the first request. Therefore, if there are [1,10] in the first requests, then [31,40] and [11,20] are legal, while [2,19] and [16,25] are not. Note that this parameter is mainly for GUI purposes, to show a few results at a time.

Opcode Listing

These opcodes can be divided into 4 categories: Get, Update, Search, Administrate. These opcodes may require different levels of privileges, including anonymous, all valid users, specific users, and administrator. For additional information, please refer to http://www.martsoft.com/ocp/semantics.htm, which is herein incorporated by reference.

OCF

The OCF catalog adapter software will now be explained in further detail. OCF is a generic product representation language. It does not define any specific categorization schemes. For instance, OCF does not define the category hierarchy or the product attribute names of a specific catalog. Instead, they are defined by the users. Therefore, OCF can be used to implement content specific standards, such as the specifications from RosettaNet.

Elements of OCF

Category

A product catalog contains a tree of categories. A category contains attributes, parameters, links, products and subcategories. Each category has a name. For instance, the category name of computer software could be "software." Each category may have an ID, which could be internally used by the catalog server. Each category may contain a path, which specifies the URL of the category. For instance, the URL of the category B under category A on host btb.martsoft.com is defined as "ocp:/Hbtb.upyp.com/A/BP".

The category defines names and types of a list of attributes, but not their values. The products under this category provide the values for these attributes.

A category defines a set of parameters which specify certain special information about the category.

A category also defines a set of links which specify linking information of the category.

An example of a category in XML is shown below:
```
<category name="software">
    <!-- attributes -->
    <attr name= . . . />
    <attr name= . . . />
    . . .
    <!-- parameters -->
    <param name= . . . />
    <param name= . . . />
    . . .
    <!-- links -->
    <link./>
    <link . . . />
    . . .
    <!-- sub-categories -->
    <category name= . . . >
    . . .
    </category>
    <!-- products -->
    <product name= . . . >
    . . .
    </product>
</category>
```

Product

A product contains attributes, parameters, and links. Each product has an ID which uniquely identifies the product under its parent category. Each product may contain a path, which specifies the URL of the product. For instance, the URL of the product 001 of category B under category A on host btb.martsoft.com is defined as "ocp://btb.upyp.com/A/B/001".

The product contains the list of attributes defined in the category. The product usually defines values for most of the attributes. Those attributes without values are undefined for the product.

A product defines a set of parameters which specify certain special information about the product. A product also defines a set of links which specify linking information of the product.

An example of a product in XML is shown below:
```
<product id="1234567">
    <!-- attributes -->
    <attr name= . . . />
    <attr name= . . . />
    . . .
    <!-- parameters -->
    <param name= . . . />
    <param name= . . . />
    <!-- links -- >
    <link . . . />
    <link . . . />
    . . .
</product>
```

Catalog

A catalog contains a tree of categories. Each catalog contains a version number, which identifies the version of the Open Catalog Format specification. An example of a catalog in XML is shown below:
```
<catalog version="1.0">
    <!-- attributes -->
    <attr name= . . . />
    <attr name= . . . />
    . . .
    <!-- parameters -->
    <param name= . . . />
    <param name= . . . />
    . . .
    <!-- links -->
    <link . . . />
    <link . . . />
    . . .
    <!-- sub-categories -->
    <category name= . . . >
    . . .
    </category>
    <!-- products -->
    <product name= . . . >
        . . .
    </product>
    . . .
</catalog>
```

The <catalog> element is similar to the <category> element, except that it may only appear as the root element of an OCF document.

Attribute

An attribute describes a property of a product. It contains a name, value, type and style. An attribute defined on a category has no value. It functions as a template for the products of the category. A category can specify whether an attribute is required. If it is required, the product must define a value for the attribute.

An example of attribute in XML is shown below:
```
<attr name="description" valuetype="string" value="this is
    a description" required="true"/>
```

Parameter

A parameter specify certain special information about a category or product. It contains a name, value, and type.

The name of parameters can bear special meaning. Parameters start with "s–"are server-side parameters; parameters start with "c-" are client-side parameters; parameters start with "n-" are network-oriented parameters. An example of parameter in XML is shown below:
```
<param name="s-double-index" valuetype="string"
    value="/A/B/"/>
```

Link

A link specifies linking information of a product or category. It has a type and a value.

An example of link in XML is shown below:
```
<link type="CrossSell" value="/A/B/"/>
```

Type System

OCF pre-defines a number of value types for attributes and parameters. Values in OCF can be divided into 3 main categories: simple value, enumeration value, and interval value. The type system also allows null values, which are typed but empty values.

Simple Value

Simple values are the most primitive value types in OCF. OCF-defined simple values include integer, boolean, float, character, and string. An example of integer value is shown below:
```
<attr name="size" valuetype="integer" value="5"/>
```

Enumeration Value

A enumeration value consists of a list of simple values of the type. OCF-defined enumeration values include integers, booleans, floats, and strings. An example of strings value is shown below:
```
<attr name="colors" valuetype="strings">
    <value>
        <val>red</val>
        <val>green</val>
    </value>
</attr>
```

Interval Value

An interval value consists of a range of simple values. Value boundaries can be closed or open. OCF-defined interval values include integer interval, float interval, and character interval. An example of float interval is shown below:
```
<attr name="weight" valuetype="float_i"
    value="[2.0,4.0)"/>
```

User-Defined Value

OCF also supports user defined value types. These values can belong to simple, enumeration, br interval value categories. An example of user-defined simple value is shown below:
```
<attr name="date" valuetype="date" value="Wed Aug 25
    20:55:42 PDT 1999"/>
```

Value Domain

A value domain defines constraints on values. OCF defines two types of value domains, namely enumeration and interval value domains. An enumeration value domain provides a selection of possible choices for a value. An interval value domain defines a range of allowed values. An example of enumeration value domain is shown below:
```
<attr name="language" valuetype="string">
    <value-domain select="1">
        <opt>English</opt>
        <opt>French</opt>
    </value-domain>
</attr>
```

An example of interval value domain is shown below:
```
<attr name="price" valuetype="float">
    <value-domain interval="(20.0, 40.0)"/>
```

</attr>

Attribute Inheritance

Attribute inheritance is one of OCF's fundamental features. A subcategory must have all attributes of its parent category. A product defines values for attributes of its parent subcategory. The parent->child category relationship is similar to the inheritance relationship between class->subclass in object oriented languages. The category->products relationship is similar to the object instantiation relationship between a class and its object instances.

Attribute inheritance has a couple of advantages. Firstly, a search for a attribute value on a high level category can be propagated to the entire product subtree rooted at that category. Therefore, users can efficiently perform searches on any branch of a catalog tree. In addition, attribute inheritance simplifies the category construction process. Since attributes in parent category are automatically inherited, these attributes don't need to be redefined in the newly created category.

A method and system for providing virtual access to information distributed across heterogeneous catalog systems has been disclosed. The e-commerce catalog system of the present invention enables catalog data interoperability and the sharing of on-line catalogs through the establishment of linking relationships and resulting content aggregation. In addition, supply chains are streamlined because any changes in price, promotions, or other product features are reflected in a timely and convenient manner to buyers.

The present invention has been described in accordance with the embodiments shown, and one of ordinary skill in the art will readily recognize that there could be variations to the embodiments, and any variations are would be within the spirit and scope of the present invention. Accordingly, many modifications may be made by one of ordinary skill in the art without departing from the spirit and scope of the appended claims.

What is claimed is:

1. A method for providing virtual access to information distributed across heterogeneous catalog systems of different suppliers, wherein each of the catalog systems include respective catalog databases comprising a collection of product/service information represented as a hierarchy of product categories, where each product category contains a list of products, comprising:
   (a) subscribing a first catalog server to at least a portion of the information stored on one or more remote catalog systems, thereby creating a subscribing catalog server, wherein the subscribing catalog server and the remote catalog systems are provided with a catalog format that defines how to represent and store the product/service information, and a catalog protocol that defines how to communicate the catalog formatted information, wherein subscribing the first catalog server further includes,
      (i) exchanging authentication information between the subscribing catalog server and the remote catalog systems;
      (ii) providing the subscribing catalog server with subscription links to desired targets on the remote catalog system, wherein targets represent nodes in the catalog trees stored in the catalog databases of the remote catalog systems;
      (iii) establishing replication scheduling parameters between the subscribing catalog server and the remote catalog systems, wherein the scheduling parameters indicate the times and events that trigger the replication of catalog data from the remote catalog systems to the subscribing catalog server; and
      (iv) acknowledging, by each of the remote catalog systems, the authentication information, the subscription links, and the scheduling parameters established between the subscribing catalog server and the remote catalog system, and granting the subscribing catalog server access to the remote catalog data;
   (b) performing a replication process using the catalog protocol to synchronize information on the subscribing catalog server with the subscribed information on the remote catalog systems; and
   (c) allowing a user of the subscribing catalog server to search and browse the synchronized information, thereby providing one site for viewing information from multiple catalog servers.

2. The method of claim 1 wherein step (a) (ii) further includes the steps of:
   (1) providing a subscription index link in which only indexes to the catalog data on the remote catalog systems are established on the subscribing server and the actual data is retrieved on demand to provide current information; and
   (2) providing a subscription product link in which remote catalog data is replicated locally on the subscribing catalog server for fastest access.

3. The method of claim 2 wherein step (b) further includes the steps of:
   (i) monitoring, by each remote catalog systems, the scheduling parameters set up during the subscription process;
   (ii) if any of the criteria specified in the scheduling parameters have been satisfied, sending a notification to the subscribing catalog server that it is time to begin replication of the catalog data; and
   (iii) allowing the catalog data specified by the subscription links to be pulled from the remote catalog systems to the subscribing catalog server by,
      (1) if subscription index links were specified, then creating indexes on the subscribing catalog server to the catalog data on the remote catalog systems, and
      (2) if subscription product links were specified, then copying the catalog data from the remote catalog systems to the subscribing catalog server.

4. The method of claim 2 wherein step (c) further includes the steps of:
   (i) if the user attempts to access data that is indexed according to subscription index links, then pulling the corresponding data from the remote catalog systems in real-time to retrieve and displaying current data; and
   (ii) if the user attempts to access data that was provided by subscription product links, then retrieving the data locally from the subscribing catalog server to provide faster data access.

5. The method of claim 1 wherein step (a) (ii) further includes the steps of
   (1) visiting the web site of each of the remote catalog systems, browsing the catalog data displayed from the corresponding catalog database; and
   (2) copying the URLs for the desired catalog data into a subscribing catalog database.

6. The method of claim 1 further including the steps of:
   defining the catalog format and the catalog protocol in catalog adapter software;
   providing the subscribing catalog server and the remote catalog systems with the catalog adapter software; and providing the subscribing catalog server with a catalog replication module for implementing the catalog protocol defined in the catalog adapter software.

7. An on-line catalog system, comprising
multiple remote catalog systems of different suppliers that are sites on a network, wherein each of the remote catalog systems include respective catalog databases containing heterogeneous catalog data comprising a collection of product/service information represented as a hierarchy of product categories, where each product category contains a list of products; and
a subscribing catalog server coupled to the remote catalog systems via the network, wherein the subscribing catalog server and the remote catalog systems are provided with a catalog format that defines how to represent and store the product/service information, and a catalog protocol that defines how to communicate the catalog formatted information wherein the subscribing server further includes subscription means for
exchanging authentication information with the remote catalog systems;
providing the subscribing catalog server with subscription links to desired targets on the remote catalog systems, wherein targets represent nodes in the catalog trees stored in the catalog databases of the remote catalog systems;
establishing replication scheduling parameters with the remote catalog systems, wherein the scheduling parameters indicate the times and events that trigger the replication of catalog data from the remote catalog systems to the subscribing catalog server; and
receiving acknowledgements from each of the remote catalog systems of the authentication information, the subscription links, and the scheduling parameters; and
wherein the subscribing catalog server subscribes to the catalog data on the remote catalog systems during a subscription process, and during a replication process, the catalog server uses the catalog protocol to gain access to the at least a portion of the catalog data stored in the remote catalog systems to which it has subscribed, wherein a user may use the subscribing catalog server search and browse the catalog data of the remote catalog systems, whereby when changes are made to the catalog data on the remote catalog systems, the changes are propagated to the subscribing catalog server to provide the user with up-to-date catalog information.

8. The system of claim 7 wherein the remote servers include replication means for,
monitoring the scheduling parameters set up during the subscription process;
if any of the criteria specified in the scheduling parameters have been satisfied, sending a notification to the subscribing catalog server that it is time to begin replication of the catalog data; and
allowing the catalog data specified by the subscription links to be pulled from the remote catalog systems to the subscribing catalog server wherein,
if subscription index links were specified, then allowing indexes to be created on the subscribing catalog server to the catalog data on the remote catalog systems, and
if subscription product links were specified, then allowing the catalog data from the remote catalog systems to be copied.

9. The system of claim 8 wherein the subscription means further includes
means for providing a subscription index link in which only indexes to the catalog data on the remote catalog systems are established and the actual data is retrieved on demand to provide current information, and
means for providing a subscription product link in which remote catalog data is replicated locally on the subscribing catalog server for fastest access.

10. The system of claim 8 wherein the subscription links are established by
visiting the web site of each of the remote catalog systems; browsing the catalog data displayed from the corresponding catalog database; and
copying the URLs for the desired catalog data into a subscribing catalog database.

11. A computer readable medium containing program instructions for providing virtual access to information distributed across heterogeneous catalog systems of different suppliers, wherein each of the catalog systems include respective catalog databases comprising a collection of product/service information represented as a hierarchy of product categories, where each product category contains a list of products, the program instructions for:
(a) subscribing a first catalog server to at least a portion of the information stored on one or more remote catalog systems, thereby creating a subscribing catalog server, wherein the subscribing catalog server and the remote catalog systems are provided with a catalog format that defines how to represent and store the product/service information, and a catalog protocol that defines how to communicate the catalog formatted information, wherein subscribing the first catalog server further includes,
(i) exchanging authentication information between the subscribing catalog server and the remote catalog systems;
(ii) providing the subscribing catalog server with subscription links to desired targets on the remote catalog system, wherein targets represent nodes in the catalog trees stored in the catalog databases of the remote catalog systems;
(iii) establishing replication scheduling parameters between the subscribing catalog server and the remote catalog systems, wherein the scheduling parameters indicate the times and events that trigger the replication of catalog data from the remote catalog systems to the subscribing catalog server; and
(iv) acknowledging, by each of the remote catalog systems, the authentication information, the subscription links, and the scheduling parameters established between the subscribing catalog server and the remote catalog system, and granting the subscribing catalog server access to the remote catalog data;
(b) performing a replication process using the catalog protocol to synchronize information on the subscribing catalog server with the subscribed information on the remote catalog systems; and
(c) allowing a user of the subscribing catalog server to search and browse the synchronized information, thereby providing one site for viewing information from multiple catalog servers.

* * * * *